United States Patent
Makiguchi et al.

(10) Patent No.: US 9,604,549 B2
(45) Date of Patent: Mar. 28, 2017

(54) VEHICLE SEAT

(71) Applicant: TOYOTA BOSHOKU KABUSHIKI KAISHA, Aichi-ken (JP)

(72) Inventors: Fumiya Makiguchi, Aichi-ken (JP); Miki Azuma, Aichi-ken (JP); Yasuhiro Kato, Gifu-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 164 days.

(21) Appl. No.: 14/025,077

(22) Filed: Sep. 12, 2013

(65) Prior Publication Data

US 2014/0077550 A1 Mar. 20, 2014

(30) Foreign Application Priority Data

Sep. 14, 2012 (JP) ................................. 2012-202946

(51) Int. Cl.
*B60N 2/02* (2006.01)
*B60N 2/64* (2006.01)
*B60N 2/70* (2006.01)

(52) U.S. Cl.
CPC .............. *B60N 2/02* (2013.01); *B60N 2/646* (2013.01); *B60N 2/70* (2013.01); *B60N 2/7017* (2013.01)

(58) Field of Classification Search
None
See application file for complete search history.

(56) References Cited

U.S. PATENT DOCUMENTS

| 3,495,871 | A | * | 2/1970 | Fussnegger | A47C 7/18 297/284.11 |
|---|---|---|---|---|---|
| 3,675,970 | A | * | 7/1972 | Bereday | 297/452.55 |
| 3,751,111 | A | * | 8/1973 | Taylor et al. | 297/452.27 |
| 3,833,454 | A | * | 9/1974 | Ambrose | 297/452.57 |
| 3,987,507 | A | * | 10/1976 | Hall | 5/653 |
| 4,522,447 | A | * | 6/1985 | Snyder et al. | 297/452.27 |
| 4,755,411 | A | * | 7/1988 | Wing | A47C 7/18 264/45.1 |
| 4,819,288 | A | * | 4/1989 | Lowthian | 5/653 |
| 4,930,171 | A | * | 6/1990 | Frantz | A47C 7/021 297/DIG. 1 |
| 4,951,334 | A | * | 8/1990 | Maier | 5/653 |
| 5,123,699 | A | * | 6/1992 | Warburton | 297/219.1 |
| 5,137,333 | A | * | 8/1992 | Chee | 297/452.21 |
| 5,189,747 | A | * | 3/1993 | Mundy et al. | 5/654 |
| 5,343,876 | A | * | 9/1994 | Rogers | A47C 7/022 128/845 |
| 5,352,023 | A | * | 10/1994 | Jay et al. | 297/452.21 |

(Continued)

FOREIGN PATENT DOCUMENTS

JP 06-133834 5/1994
JP 2011-130899 7/2011

*Primary Examiner* — David E Allred
(74) *Attorney, Agent, or Firm* — Greenblum & Bernstein, P.L.C.

(57) ABSTRACT

A vehicle seat including: a cushion pad having elasticity and configured to be bent by a load of an occupant, the cushion pad including: a foamed-resin body made of foamed resin and provided at an ischium corresponding portion of the cushion pad, which is configured to support at least an ischial tuberosity of an occupant, and a first high elastic body of a sheet shape having a degree of elasticity higher than that of the foamed-resin body and provided at a front end portion of the cushion pad.

8 Claims, 4 Drawing Sheets

(56) References Cited

U.S. PATENT DOCUMENTS

| | | | | |
|---|---|---|---|---|
| 5,369,828 | A | * | 12/1994 | Graebe .................... A47C 4/54 297/452.41 |
| 5,442,823 | A | * | 8/1995 | Siekman et al. ................... 5/653 |
| 5,737,788 | A | * | 4/1998 | Castellino et al. ............ 5/655.5 |
| 5,791,736 | A | * | 8/1998 | Herbert .................... 297/452.21 |
| 5,950,263 | A | * | 9/1999 | Hanson et al. ................... 5/653 |
| 6,199,252 | B1 | * | 3/2001 | Masters et al. ................ 29/91.1 |
| 6,293,625 | B1 | * | 9/2001 | Dixon .................... A47C 7/022 297/452.23 |
| 6,336,681 | B1 | * | 1/2002 | Crosbie .................... A47C 7/18 297/452.21 |
| 6,604,750 | B2 | * | 8/2003 | Malassigne et al. ...... 280/250.1 |
| 6,625,830 | B2 | * | 9/2003 | Lampel ............................. 5/653 |
| 6,755,475 | B1 | * | 6/2004 | Tiesler et al. ............ 297/452.26 |
| 7,530,640 | B2 | * | 5/2009 | Walters et al. .......... 297/440.22 |
| 7,585,030 | B2 | * | 9/2009 | Galbreath ................ B60N 2/70 297/452.27 |
| 8,141,957 | B2 | * | 3/2012 | McClung ............... A47C 7/282 297/452.27 |
| 8,607,387 | B2 | * | 12/2013 | Flick et al. .................... 5/655.5 |
| 8,696,067 | B2 | * | 4/2014 | Galbreath .............. B60N 2/012 297/452.1 |
| 9,295,599 | B2 | * | 3/2016 | Dyevich ............ A61G 7/05715 |
| 2002/0017733 | A1 | * | 2/2002 | Kobayashi .......... B29C 44/0469 264/45.4 |
| 2011/0156467 | A1 | | 6/2011 | Murata et al. |
| 2016/0143442 | A1 | * | 5/2016 | Nakada .................... A47C 7/24 297/452.48 |

\* cited by examiner

// VEHICLE SEAT

CROSS-REFERENCE TO RELATED APPLICATIONS

This application claims priority from Japanese Patent Application No. 2012-202946 filed on Sep. 14, 2012, the entire contents of which are incorporated herein by reference.

TECHNICAL FIELD

Aspects of the invention relate to a vehicle seat.

BACKGROUND

In a vehicle seat for a vehicle occupant, a cushion pad including a foamed-resin material, such as polyurethane foam, is used as a seat cushion on which the occupant sits. For example, such a cushion pad is disclosed in JP-A-H06-133834.

The cushion pad has a sufficient thickness to be able to exert performance such as a cushion feeling related to seat comfort or durability. In particular, in a seat cushion of a full-form type which does not use a spring made of a metal wire under the cushion pad, the performance of the cushion pad itself becomes important. However, there is a case where the cushion pad is demanded to be thinner under various circumstances. For example, a battery pack which is one of power sources may be mounted below the seat cushion in a hybrid electric vehicle. For this reason, it is necessary to ensure a space for the battery pack by shortening the whole height of a seat assembly, and therefore, the cushion pad which is a part of the seat assembly is demanded to be thinner.

SUMMARY

However, according to the observation of a motion of the occupant when particularly getting in a vehicle having a low vehicle height, such as a sedan, the occupant cannot initially deeply sit down to a normal seated position. That is, a stepwise aspect is observed in which after a waist (buttocks) of the occupant shallowly perches on a front portion of the seat cushion, the occupant deeply reseats his or her posture to a rear portion. For this reason, if the cushion pad is made thinner, the occupant feels a bottoming feeling not only in a normal sitting state but also in a state in which the occupant temporarily perches on the front end portion of the seat cushion when getting in the vehicle.

Accordingly, a cushion pad which hardly gives a bottoming feeling when an occupant temporarily perches on a front end portion of a seat cushion at the time of getting on a vehicle, even in a case where the front end portion is thin, is provided.

According to an aspect of the present invention, there is provided a vehicle seat including: a cushion pad having elasticity and configured to be bent by a load of an occupant, the cushion pad including: a foamed-resin body made of foamed resin and provided at an ischium corresponding portion of the cushion pad, which is configured to support at least an ischial tuberosity of an occupant, and a first high elastic body of a sheet shape having a degree of elasticity higher than that of the foamed-resin body and provided at a front end portion of the cushion pad.

Accordingly, since the high elastic body having a degree of elasticity higher than that of the foamed-resin body supporting the ischial tuberosity of the occupant is provided at the front end portion of the cushion pad, the load applied to the front end portion can be supported by the high elastic body. Therefore, even though the cushion pad is thin, it can eliminate a bottoming feeling that is felt by the occupant who temporarily perches on the front end portion of the seat cushion when getting on a vehicle.

DETAILED DESCRIPTION

Figure 1:
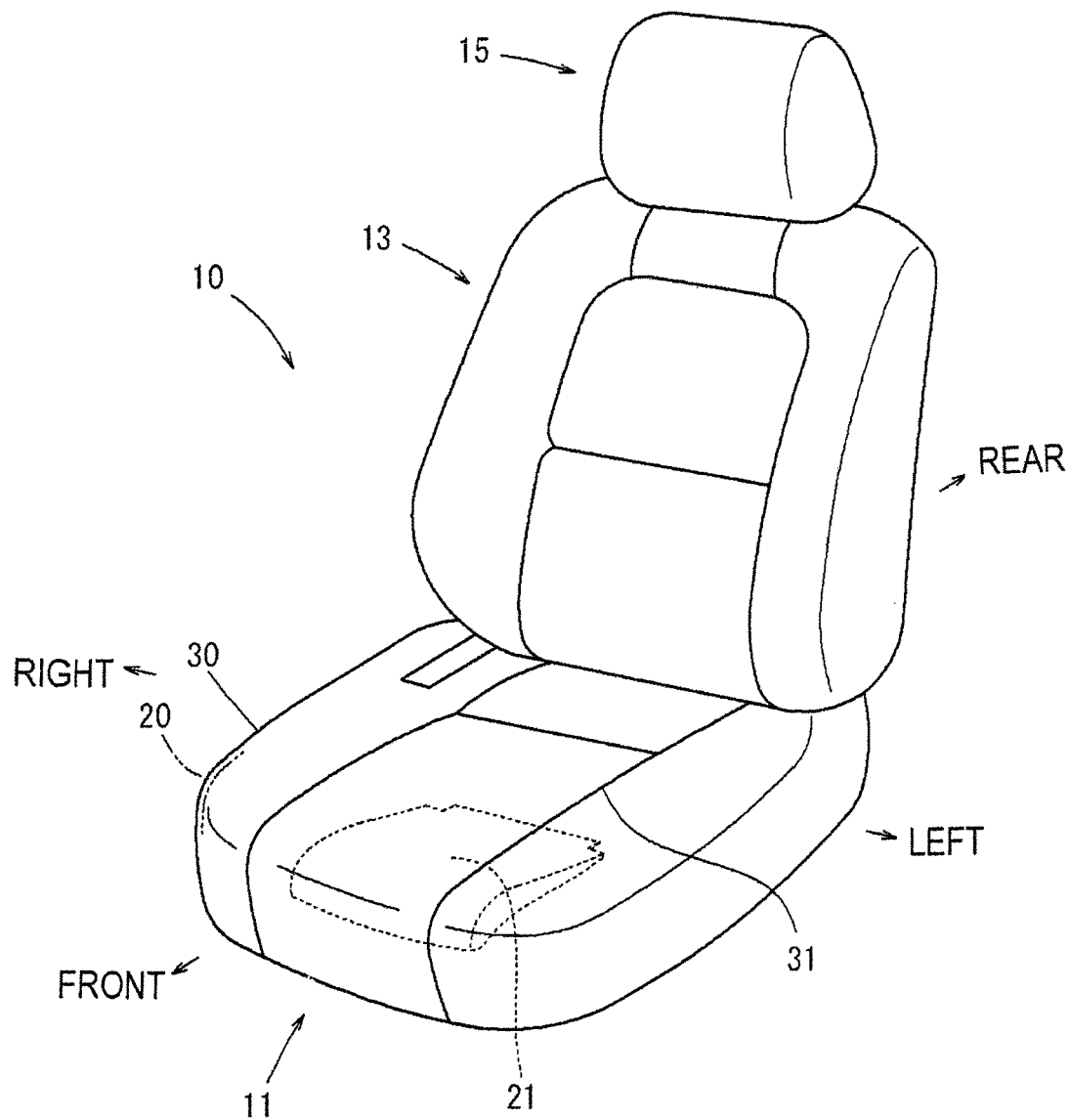
FIG. 1 is a front view illustrating a seat according to an exemplary embodiment.

Hereinafter, an exemplary embodiment for carrying out the present invention will now be described with reference to the accompanying drawings. A vehicle seat 10 includes, as illustrated in FIG. 1, a seat cushion 11 on which an occupant of a vehicle sits, a seat back 13 serving as a backrest for the passenger, and a headrest 15 supporting a head of the occupant. The seat back 13 is connected to a rear end portion of the seat cushion 11. The seat cushion 11 includes a frame (not illustrated) forming a framework, a cushion pad 20 attached to the frame, and a cover 30 covering the cushion pad 20.

Figure 2:
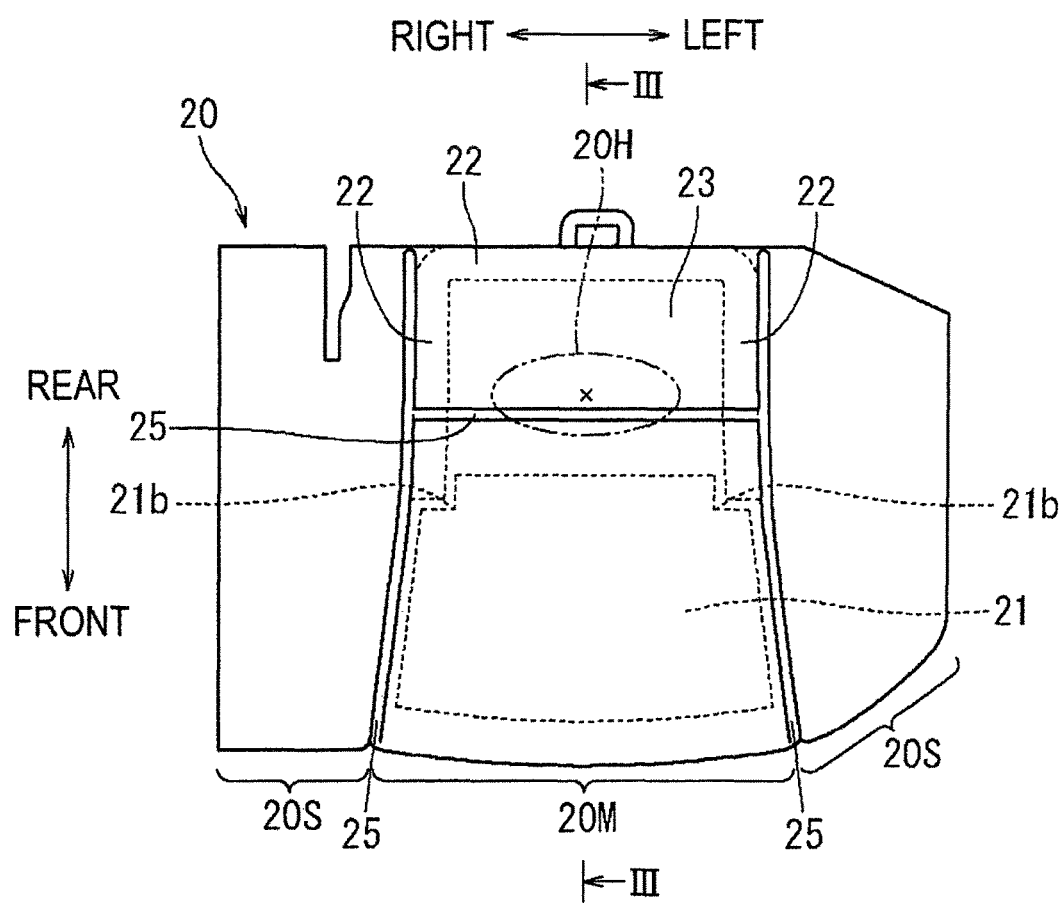
FIG. 2 is a plan view of a seat cushion illustrating a plane arrangement of a high-elastic body.

The cushion pad 20 is a cushion material having an appropriate cushion property and is formed in a pad shape of a predetermined thickness, and is bent by a load of the occupant to bring a reaction force caused by its elasticity thereby to support the occupant. The cushion pad 20 has, as illustrated in FIG. 2, a main portion 20M occupying its center in a width direction of the seat, and side support portions 20S occupying both left and right side portions. The main portion 20M functions as a sitting surface which receives buttocks and thighs of the occupant, and is a portion having a substantially horizontal surface with respect to the width direction of the seat. The side support portion 20S is a portion having a surface swelling upwardly in an embankment shape higher than the sitting surface of the main portion 20M to maintain a posture of the occupant with respect to the width direction of the seat at turning.

Figure 4:
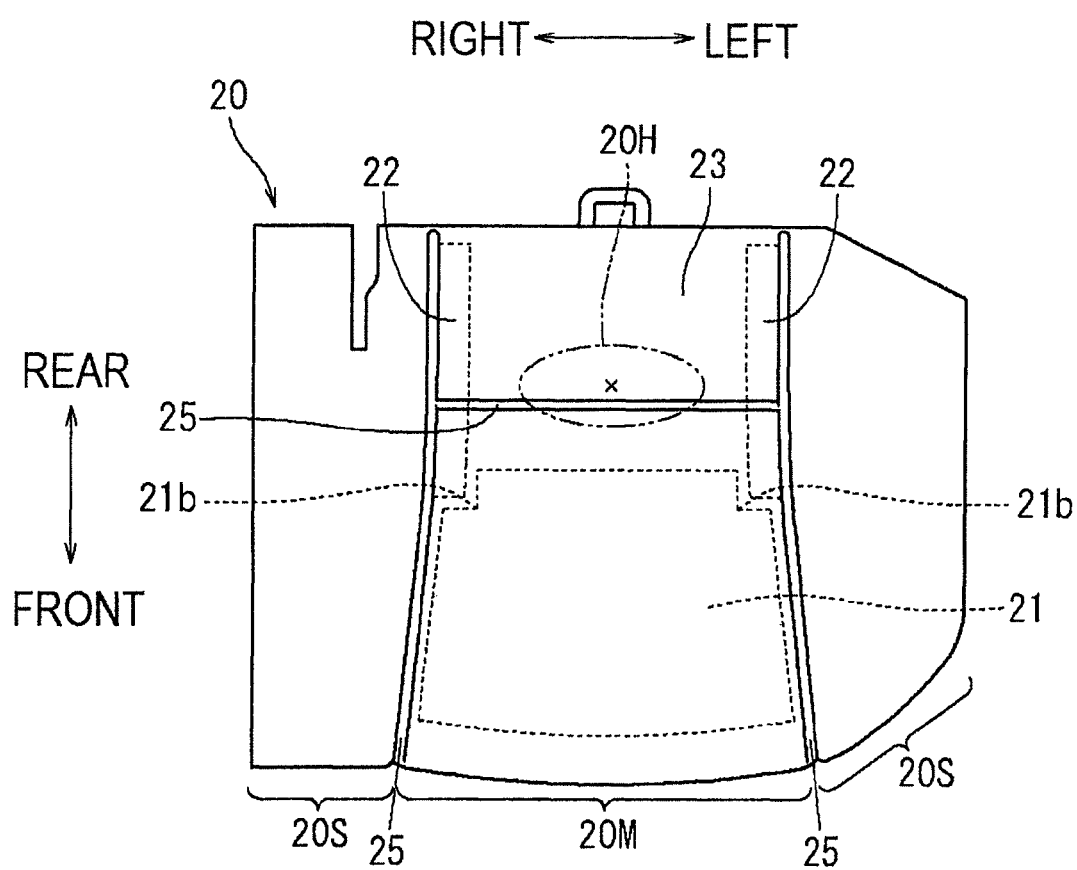
FIG. 4 is a plan view of a seat cushion according to a modified embodiment, illustrating a plane arrangement of a high-elastic body.

As illustrated in FIG. 4, the vicinity of the boundary between the main portion 20M and the side support portions 20S is formed in a shape of a concave surface by the side support portions 20S of the embankment shape. To set the cover 30 (see FIG. 1) along the surface shape of the cushion pad 20, the surface of the cushion pad 20 is provided with a hanging groove 25 is formed along the boundary between the main portion 20M and the side support portions 20S, and a retainer for catching the cover 30 is fixed to the inside of the hanging groove 25. The hanging groove 25 is formed to the cushion pad 20 in such a way that the main portion 20M traverses in the width direction of the seat, and thus the cushion pad 20 is generally formed in an H-shape.

The cushion pad 20 has high elastic bodies 21 and 22 of a block shape which are respectively provided at a front portion and a rear portion of the main portion 20M, as illustrated in a plan view of FIG. 2. The portion of the cushion pad 20, other than the front and rear portions to which the high elastic bodies are provided, is made of a foamed-resin body 23, such as polyurethane foam, which is generally used as a material of the cushion pad. The high elastic bodies 21 and 22 are an elastic body having a degree of elasticity higher than that of the foamed-resin body 23.

As a whole, the high elastic body 21 placed at the front side is provided at a front side than an ischium corresponding portion 20H which receives the ischium (particularly ischial tuberosity) of the occupant. The shape of the high elastic body 21 is formed in a substantially rectangular shape when seen from a plan view, and its size extends to the vicinity of the front end portion of the cushion pad in a forward direction, and to the whole width of the main portion 20M of the cushion pad in left and right sides. The load applied to the front end portion of the cushion pad can be reliably supported by the high elastic body 21 before the bending of the cushion pad is bottomed. Consequently, even though the front portion of the cushion pad is thin, it can eliminate a bottoming feeling that is felt by the occupant who temporarily perches on the front end portion of the seat cushion when getting on the vehicle.

Figure 3:
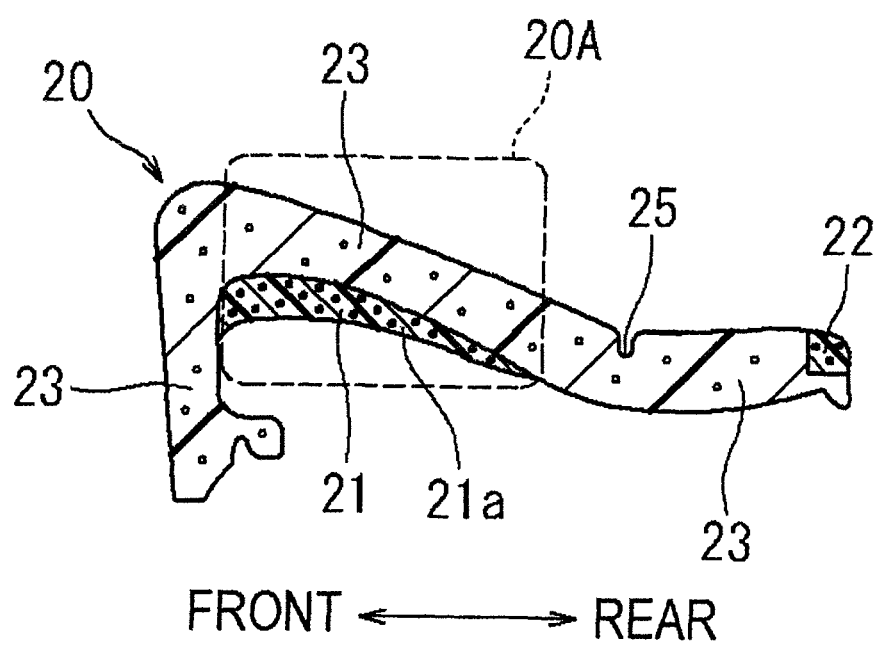
FIG. 3 is a cross-sectional view of the seat cushion taken along the line III-III in FIG. 2.

Further, as illustrated in the cross-sectional view of FIG. 3, the high elastic body 21 at the front side is provided at a under layer of the cushion pad 20. That is, the cushion pad 20 having the high elastic body 21 provided at the under layer forms a structure in which the high elastic body 21 and the foamed-resin material 23 of the under layer are layered. Accordingly, even in a normal sitting state, the thighs of the occupant can be supported by the foamed-resin material 23 of the upper layer in a layered section 20A, with the occupant feeling a soft feeling. In addition, since a distribution of sitting pressure is hardly disordered even for a long time, the cushion pad can have good sitting comfort.

The cushion pad 20 in the layered section 20A is formed so that its thickness is gradually decreased toward its rear side, as illustrated in FIG. 3. The thickness of the high elastic body 21 of the under layer is substantially constant in a forward and rear direction in the front portion in which the cushion pad is formed to have a relatively thick thickness as a whole. However, the thickness of the high elastic body 21 of the under layer is gradually decreased toward the rear side, that is, the ischium corresponding portion 20H (see FIG. 2), so that the thickness of the foamed-resin material 23 of the upper layer in the rear portion is assured to be substantially constant. The high elastic body 21 is formed so that its thickness converges into almost zero in its rear end. In this way, the high elastic body 21 placed at the front side has a converged portion 21a of the thickness at the rear portion, and is formed in the shape of a wedge as a whole. Since the converged portion 21a of the thickness is provided, hardness of the cushion pad is smoothly changed from the layered portion 20A to the ischium corresponding portion made of only the foamed-resin material 23 at the rear side of the layered portion 20A. Consequently, in the normal sitting state, the distribution of the sitting pressure can be uniform, and the occupant does not feel a foreign body feeling at the changing portion.

The high elastic body 22 placed at the rear side is provided at both sides and the rear side of the ischium corresponding portion 20H to avoid the ischium corresponding portion 20H. For example, the high elastic body is formed in a rod shape which is bent in a shape of a horseshoe (U-shape), with its front side being opened, as illustrated in FIG. 2. The ischium corresponding portion 20H is provided to be received within the opened portion of the horseshoe-shaped portion. It is preferable that an interval between left and right sides forming the horseshoe-shaped portion is 200 mm or more. The cross section of the rod shape may be formed in various shapes, such as rectangle or triangle. According to this, in the normal sitting state, the load applied to the ischium corresponding portion 20H of the cushion pad can be softly supported by the foamed-resin material 23, and, simultaneously, the load applied to the rear portion of the cushion pad can be reliably supported by the high elastic body 22.

The high elastic body 21 placed at the front side has chips at both left and right corners of its rear portion to form inwardly dented defects 21b. The high elastic body 22 placed at the rear side is provided so that the front end portions of both left and right sides forming the opened portion of the horseshoe-shaped portion are respectively received in the defects 21b of the high elastic body 21 placed at the front side. In other words, the center portion of the rear end of the high elastic body 21 placed at the front side enters the opened portion of the horseshoe-shaped portion formed by the high elastic body 22 placed at the rear side. Accordingly, the high elastic bodies 21 and 22 of a different purpose placed at the front and rear sides can be arranged so that these materials are overlapped with each other in a front and rear direction as much as possible.

The high elastic bodies 21 and 22 according to this exemplary embodiment may have a composite structure, for example, of which gaps of a three-dimensional netty structure are filled with foam resin. The composite structure can be fabricated by penetrating (impregnating) a foamed-resin base material in the gaps of the three-dimensional netty structure and then foaming it. The term 'three-dimensional netty structure' herein means a structure having a net-like organization which forms communicated gaps and spreads three-dimensionally. The structure exhibits elasticity by deformation of the net-like organization. In addition, since the foam resin is impregnated in the gaps of the net-like organization, as described above, elasticity of the impregnated foam resin is added, as well as the elasticity provided by the net-like organization. Both elastic modules of the three-dimensional netty structure and the foam resin are set so that the total degree of elasticity of the composite is higher than that of the foamed-resin body 23 occupying the ischium corresponding portion 20H.

Although the high elastic bodies 21 and 22 according to this exemplary embodiment are formed separately from other portions made of the foamed-resin body 23 and then are adhered thereto, the high elastic bodies may be integrally formed by penetrating a part of the foamed-resin base material in the net-like organization when the other portions are foam-molded. That is, the high elastic bodies can be molded integrally with the foamed-resin body 23 occupying the most of the cushion pad by installing and fixing the three-dimensional netty structure at an intended position in a mold for molding the cushion pad 60 and then carrying out a common foaming process on the mold.

The high elastic body 21 placed at the front side and having the defects 21b at both left and right corners at the rear portion thereof and the high elastic body 22 placed at the rear side and formed to have the horseshoe shape with the opened front portion are arranged so that concave and convex portions are fitted to each other. For this reason, it is easy to determine the relative position of the three-dimensional netty structure which is set in the mold for forming the high elastic bodies 21 and 22 placed at the front and rear sides.

The three-dimensional netty structure may use a fiber structure made of, for example, a filament of thermoplastic resin. The fiber structure is one in which the filament of the thermoplastic resin forms a plurality of loops that are entangled in the-dimensional disorder, and contact portions of the filament are adhered to each other by heat. As the thermoplastic resin material, a common plastic, such as polyester or polyether, can be used. The filament of the thermoplastic resin can be continuously shaped by extrusion molding, and its shape can be varied by selecting a size or shape of its cross section and/or a hollow or solid cross section. The plurality of disordered loops formed by the filament form the isotropic three-dimensional spring structure, and the plurality of loops are respectively deflected to exhibit the whole elasticity of the structure. As well as changing the shape of the cross section of the filament, as described above, the degree of elasticity can be adjusted by changing apparent density of the filament which spreads three-dimensionally.

The present invention is not limited to the above-described embodiment, and can be carried out in various aspects. For example, the section in which the high elastic body is provided at the front side in the exemplary embodiment need not be formed in the layered structure, but may be configured by only the high elastic structure from the upper layer to the under layer. The cushion pad does not necessarily include the high elastic body 22 at the rear side. In the case where the high elastic body 22 is provided at the rear side, in addition to the horseshoe shape shown in FIG. 2, the high elastic body 22 may be provided at only the left and right sides, without being provided at the rear portion, as illustrated in FIG. 4. The high elastic bodies 21 and 22 provided at the front and rear sides can be formed integrally with each other.

Further, the high elastic body of the present invention is not limited to the composite structure of which the gaps of the three-dimensional netty structure are filled with the foam resin, as described above, but may be made of a foamed-resin body having the degree of elasticity higher than that provided at the ischium corresponding portion 20H. The degree of elasticity of the foamed-resin body can be changed by adjusting, for example, a composition or density of the foam resin.

The present invention provides illustrative, non-limiting examples as follows:

(1) In a first aspect, there is provided a vehicle seat including: a cushion pad having elasticity and configured to be bent by a load of an occupant, the cushion pad including: a foamed-resin body made of foamed resin and provided at an ischium corresponding portion of the cushion pad, which is configured to support at least an ischial tuberosity of an occupant, and a first high elastic body of a sheet shape having a degree of elasticity higher than that of the foamed-resin body and provided at a front end portion of the cushion pad.

Accordingly to the first aspect, since the high elastic body having a degree of elasticity higher than that of the foamed-resin body supporting the ischial tuberosity of the occupant is provided at the front end portion of the cushion pad, the load applied to the front end portion can be supported by the high elastic body. Therefore, even though the cushion pad is thin, it can eliminate a bottoming feeling that is felt by the occupant who temporarily perches on the front end portion of the seat cushion when getting on a vehicle.

(2) In a second aspect, there is provided the vehicle seat according to the first aspect, wherein the first high elastic body is provided at an under layer of the front end portion of the cushion pad.

According to the second aspect, since the high elastic body is provided at the under layer of the front end portion of the cushion pad, a top surface layer has a soft feeling, so that it is possible to suppress sitting pressure from excessively concentrating thereon. Therefore, since a distribution of the sitting pressure is hardly disordered in a normal sitting state, the cushion pad can have good sitting comfort.

(3) In a third aspect, there is provided the vehicle seat according to the first or second aspect, wherein a thickness of the first high elastic body varies toward one side.

As a preferable example, the thickness of the high elastic body can be decreased toward the rear. Accordingly, the distribution of the sitting pressure can be uniform in the normal sitting state by varying the thickness of the high elastic body.

(4) In a fourth aspect, there is provided the vehicle seat according to any one of the first to third aspects, wherein the cushion pad includes a second high elastic body arranged separately from the first high elastic body, and wherein the first high elastic body includes an inwardly dented defect at a corner of a rear portion of the sheet shape, and the second high elastic body is provided such that a portion of the second high elastic body enters the defect.

According to the fourth aspect, since the first and second high elastic bodies can be overlapped with each other in a front and rear direction, and the high elastic bodies can be arranged more freely according to the purpose of each high elastic body.

(5) In a fifth aspect, there is provided the vehicle seat according to the first aspect, wherein the first high elastic body is provided at the front end portion of the cushion pad which is at a front side than the ischium corresponding portion.

What is claimed is:

1. An automotive vehicle seat for an automotive vehicle, the automotive vehicle seat comprising:
a seat cushion, a seat back connected to a rear end portion of the seat cushion, wherein the seat cushion includes a frame that is fastenable to the automotive vehicle and a cushion pad attached to the frame,
the cushion pad having elasticity and having a main portion and side support portions, the cushion pad configured to be bent by a load of an occupant in the automotive vehicle seat, the cushion pad including:
a foamed-resin body made of foamed resin and provided at least at the main portion of the cushion pad, which is configured to support an occupant, and
a first high elastic body having a degree of elasticity higher than that of the foamed-resin body and provided at a front end portion of the main portion of the cushion pad across substantially a whole width of the main portion,
wherein the first high elastic body is a unitary structure, and
wherein, at the front end portion of the main portion of the cushion pad, the foamed-resin body serves as an upper layer and the first high elastic body serves as a lower layer,
wherein the cushion pad includes a second high elastic body arranged separately from the first high elastic body, the second high elastic body having forwardly projecting portions at left and right sides of the cushion pad, and
wherein the first high elastic body includes an inwardly dented defect at each of left and right rear corners defining a rearwardly projecting portion between the defects such that the forwardly projecting portions of the second high elastic body enter the defects on opposite sides of the rearwardly projecting portion of the first high elastic body.

2. The automotive vehicle seat according to claim 1, wherein the first high elastic body is provided at an under layer of the front end portion of the cushion pad.

3. The automotive vehicle seat according to claim 1, wherein a thickness of the first high elastic body varies toward a rear side of the first high elastic body.

4. The automotive vehicle seat according to claim 1, wherein the first high elastic body is provided only at the front end portion of the cushion pad.

5. The automotive vehicle seat according to claim 1, wherein the first high elastic body comprises a tear drop shape having a substantially constant thickness in a front portion of the first high elastic body, and a tapering thickness in a rear portion of the first high elastic body.

6. The automotive vehicle seat according to claim 5, wherein the tapering thickness in the rear portion of the first high elastic body converges to approximately zero at a rear end of the rear portion.

7. The automotive vehicle seat according to claim 1, wherein the first high elastic body comprises a wing shape having a substantially constant thickness in a front portion of the first high elastic body, and a tapering thickness in a rear portion of the first high elastic body.

8. The automotive vehicle seat according to claim 1, wherein each of the side support portions is a portion having a surface swelling upwardly in an embankment shape higher than a sitting surface of the main portion.

* * * * *